United States Patent [19]

Gofuku et al.

[11] Patent Number: 4,785,157

[45] Date of Patent: Nov. 15, 1988

[54] METHOD FOR CONTROLLING ELECTRIC RESISTANCE OF A COMPOUND-TYPE RESISTORS

[75] Inventors: Eishi Gofuku; Mitsuyuki Takada; Hayato Takasago, all of Amagasaki, Japan

[73] Assignee: Mitsubishi Denki Kabushiki Kaisha, Japan

[21] Appl. No.: 992

[22] Filed: Jan. 7, 1987

[30] Foreign Application Priority Data

Jan. 9, 1986 [JP] Japan .................................... 61-2476

Jul. 15, 1986 [JP] Japan ................................ 61-167128

[51] Int. Cl.[4] ............................................. B23K 26/00

[52] U.S. Cl. ................................. 219/121.85; 29/846; 338/195

[58] Field of Search .... 219/121 L, 121 LM, 121 LH, 219/121 LJ; 338/195; 29/846

[56] References Cited

U.S. PATENT DOCUMENTS 3,056,881 10/1962 Schwarz ........................... 29/846 X 3,889,272 6/1975 Lou et al. .................. 219/121 LJ X 4,146,673 3/1979 Headley ..................... 219/121 LJ X 4,242,152 12/1980 Stone ........................ 219/121 LM X 4,395,436 7/1983 Bianchi et al. .......... 219/121 LM X 4,489,230 12/1984 Yamamoto .................. 219/121 LM

OTHER PUBLICATIONS

"Handbook of Thick film Technology", Holmes et al., Electrochemical Publications Limited, 1976.

*Primary Examiner*—C. L. Albritton

*Attorney, Agent, or Firm*—Leydig, Voit & Mayer

[57] ABSTRACT

A method for controlling electric resistance of a compound-type resistant material is disclosed in which a laser beam is irradiated on a compound-type resistant material so as to cause a change in its chemical state whereby the specific resistance inherent to the compound-type resistant material is varied thereby to change its electric resistance in an appropriate manner. If necessary, a portion of the resistant material may be cut away by irradiation of a laser beam so as to further control the resistance value of the resistant material in an increasing sense.

31 Claims, 2 Drawing Sheets

METHOD FOR CONTROLLING ELECTRIC RESISTANCE OF A COMPOUND-TYPE RESISTORS

BACKGROUND OF THE INVENTION

1. Field of the Invention

This invention relates to a method for controlling electric resistance of a compound-type resistor such as, for example, a metallic-oxide-type resistor in the form of a film provided on a electrically insulated base.

2. Description of the Prior Art

FIG. 3 is a schematic illustration showing a conventional method for controlling electric resistance of a compound-type resistor described in a magazine entitled "Electronic Engineering", volume 25, No. 14, pages 32 and 33, issued in 1983. In this figure, reference numeral 1 designates a compound-type resistor material (hereinafter referred to as resistor material) such as, for example, a metallic-compound-type electric resistor material whose electric resistance is adapted to be controlled in an appropriate manner. Connected with the resistor material 1 are a pair of electrically conductive bases 2. A pair of probes 3 have their pointed tip ends in contact with the surfaces of the respective bases 2. The probes 3 are electrically connected with a controller 4 which is adapted to meter electric resistance of the resistor material 1 so as to control "on" and "off" switching as well as scanning of a laser beam 5 which is, for example, a continuously oscillated laser beam or a pulsed laser beam having short interval pulses.

With the above-described arrangement, the laser beam 5 issued from a laser source (not shown) such as a laser oscillator is condensed by means of a known appropriate optical system so as to be focused upon the resistor material 1 which is to have electric resistance controlled. Then, the pair of probes 3 are placed in contact with the surfaces of the electrically conductive bases 2, which are connected to the opposite ends of the resistor material 1, respectively, for measuring electrical resistance of the resistor material 1, and at the same time, the laser beam 5 is irradiated from the laser source (not shown) onto the resistor material 1 so that a part of the resistor material 1 is instantaneously vaporized and thus cut away, thereby increasing electric resistance thereof. As a result, by cutting away the resistor material 1 to provide a desired value of electric resistance by means of the laser beam 5, it is possible to obtain a resistor having the required resistance value.

With the above-mentioned conventional method for controlling electric resistance of a compound-type resistor material, however, electric resistance of a resistor can only be controlled so as to increase resistance. Accordingly, it is necessary to set the electric resistance of a resistor, prior to control of its electric resistance, at a value lower than the desired value. To this end, the area of the resistor marterial 1 must be set at a larger value because the thickness of the compound-type resistor material such as a metallic-oxide-type resistor in the form of a thick film, which is usually produced by screen printing technique, can not be increased to a value greater than about 10 μm. For this reason, the area of a base board to be occupied by the resistor mounted thereon necessarily increases, thus posing a problem in that it is difficult or impossible to miniaturize a hybrid IC mounting thereon such resistors as well as to increase density or efficiency in arrangement thereof.

Also, there is another problem in that a cutting groove, formed in the resistor material 1 by irradiation thereon of the laser beam 5, is liable to be subject to generation of micro cracks at the peripheral edge thereof so that with the passage of time such a compound-type resistor undergoes changes in electric resistance thereof.

Moreover, in cases where the resistor material 1 is cut to an excessive extent by means of the laser beam 5, it is impossible to remedy or revise such an excessive increase in the resistance value of the resistor material 1 due to the fact that the electric resistance of the resistor material 1 can by no means be decreased. In fact, if the cutting speed, at which the resistor material 1 such as a metallic-oxide-type resistor material in the form of a thick film produced by screen printing is cut by a laser beam, is increased beyond a certain extent, there will be a time lag between measurement of the resistance value of the resistor material 1 and scanning of the laser beam 5 so that the resistor material is cut excessively, rendering the resistance value thereof higher than a desired value. For this reason, the cutting speed of the laser beam 5 can not be increased very much and it is difficult to obtain the objective resistance value.

SUMMARY OF THE INVENTION

In view of the above, the principal object of the present invention is to obviate the above-described problems of the prior art.

It is an object of the present invention to provide a novel and improved method for controlling electric resistance of a compound-type resistor in which the area of the resistor can be substantially reduced so that, when the invention is applied to a metallic-oxide-type resistor, it is possible to realize miniaturization of a hybrid IC having such a resistor mounted thereon as well as high density arrangement thereof, and in which the compound-type resistor is not substantially subject to any changes in its electric resistance over time, It is another object of the present invention to provide a novel and improved method for controlling electric resistance of a compound-type resistor in which an intended value of electric resistance of the resistor can be obtained without any difficulty.

In order to achieve the above objects, according to one aspect of the present invention, there is provided a method for controlling electric resistance of a compound-type resistor material comprising:

irradiating a laser beam on a compount-type resistor material so as to cause a change in its chemical state whereby the specific resistance inherent to the compound-type resistor material is varied thereby to change its electric resistance in an appropriate manner.

In one embodiment, by irradiation of the laser beam, the compound-type resistor material is subjected to a reducing reaction so that the specific resistance inherent to the compound-type resistor material is decreased, thereby reducing its electric resistance.

It is preferable that the amount of decrease in the resistance value of the compound-type resistor material be controlled by laser beam irradiation conditions including the number of pulses, the pulse width, the output power, the intervals between pulses, the distance between the surface of the compound-type resistor material and the focal point of the laser beam, and type and temperature of the atmosphere surrounding the surface of the compound-type resistor material.

In another embodiment, by irradiation of the laser beam, the compound-type resistor material is subjected to an oxidizing reaction so that the specific resistance inherent to the compound-type resistor material is increased, thereby increasing its electric resistance.

It is preferable that the amount of increase in the resistance value of the compound-type resistor material be controlled by laser beam irradiation conditions including the number of pulses, the pulse width, the output power, the intervals between pulses, the distance between the surface of the compound-type resistor material and the focal point of the laser beam, and type and temperature of atmosphere surrounding the surface of the compound-type resistor material.

According to another aspect of the present invention, there is provided a method for controlling electric resistance of a compound-type resistor material comprising:

a first step of irradiating a laser beam onto a compound-type resistor material to cut away a portion thereof, thus increasing its electric resistance; and a second step of irradiating a laser beam on the compound-type resistor material so as to cause a change in its chemical state whereby the specific resistance inherent to the compound-type resistor material is varied to thereby change its electric resistance in an appropriate manner.

In a further embodiment, the first step is carried out before the second step.

In this case, it is preferable that in the first step, the resistance value of the compound-type resistor material be increased beyond a predetermined value, and that in the second step, by irradiation of the laser beam, the compound-type resistor material be subjected to a reducing reaction so that the specific resistance inherent to the compound-type resistor material is decreased, thereby reducing its electric resistance to the predetermined value.

Preferably, the amount of decrease in the resistance value of the compound-type resistor material is controlled by the irradiation conditions of the laser beam including the number of pulses, the pulse width, the output power, the intervals between pulses, the distance between the surface of the compound-type resistor material and the focal point of the laser beam, and type and temperature of atmosphere surrounding the surface of the compound-type resistor material.

In a still further embodiment, the second step is carried out before the first step.

In this case, it is preferable that in the first step, the resistance value of the compound-type resistor material be increased to a value smaller than a predetermined value, and that in the second step, by irradiation of the laser beam, the compound-type resistor material be subjected to an oxidizing reaction so that the specific resistance inherent to the compound-type resistor material is increased, thereby increasing its electric resistance to the predetermined value.

Preferably, the amount of increase in the resistance value of the compound-type resistor material is controlled by the irradiation conditions of the laser beam including the number of pulses, the pulse width, the output power, the intervals between pulses, the distance between the surface of the compound-type resistor material and the focal point of the laser beam, and type and temperature of atmosphere surrounding the surface of the compound-type resistor material.

It is preferable that the compound-type resistor material be selected from the group consisting of a metallic-oxide-type resistor material, a metallic-nitride-type resistor material, and a metallic-carbide-type resistor material.

In a further embodiment, the resistor material has a film of a laser-beam transmitting material formed on its surface.

Preferably, the laser-beam transmitting material comprises a polymer such as polyimide.

The above and other objects, features and advantages of the present invention will become apparent from the following detailed description of a few presently preferred embodiments of the invention when taken in conjunction with the accompanying drawings.

DESCRIPTION OF THE PREFERRED EMBODIMENTS

Figure 1:
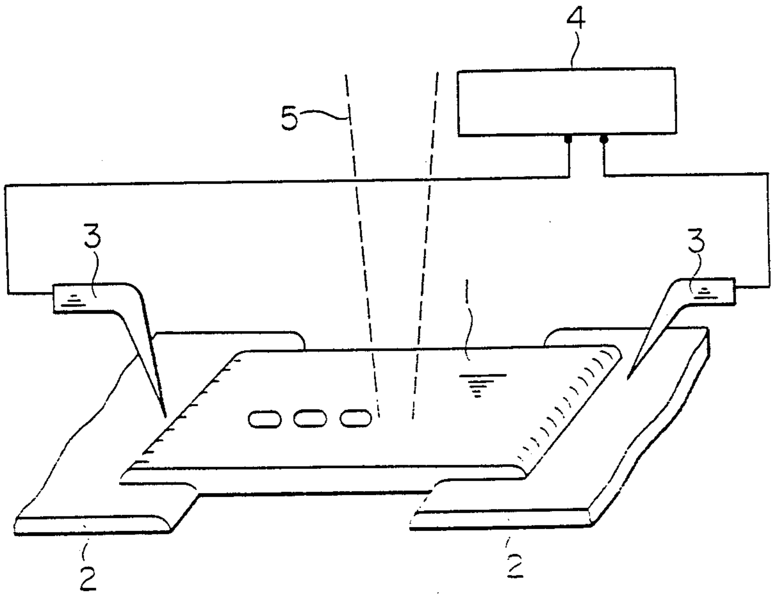
FIG. 1 is a schematic illustration showing a method for controlling electric resistance of a compound-type resistor in accordance with one embodiment of the present invention.

Now, the present invention will be described in detail with reference to a few presently preferred embodiments thereof as illustrated in the drawings. In the following description and the drawings, the same parts or elements of the embodiments shown in FIGS. 1 and 2 are identified by the same reference numerals as employed in FIG. 3.

Figure 2:
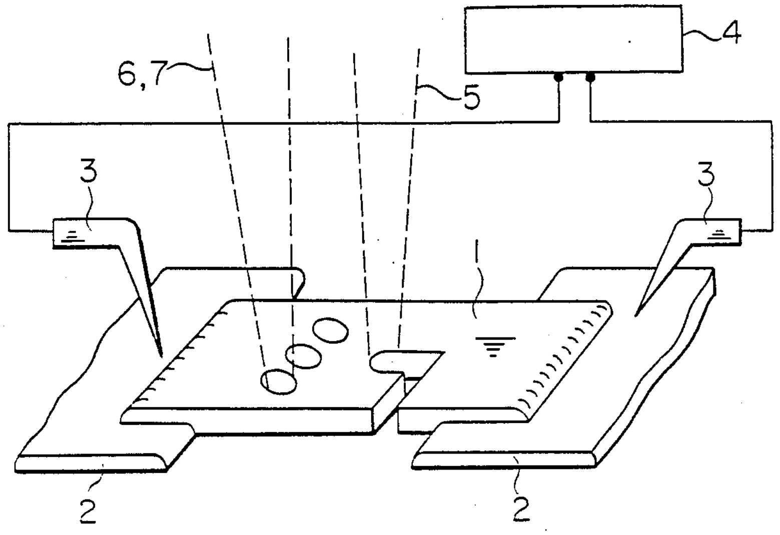
FIG. 2 is a schematic illustration showing a method for controlling electric resistance of a compound-type resistor in accordance with another embodiment of the present invention.

FIG. 1 schematically shows a method for controlling electric resistance of a compound-type resistor in accordance with a first embodiment of the invention. In FIG. 1, there are illustrated a compound-type electrically resistor material 1 (hereinafter referred to as a resistor material) such as, for example, a metallic-oxide-type thick-film like resistor material which may be, for example, a ruthenium-oxide ($RuO_2$) type thick-film like resistor material such as one composed of conductive particles of ruthenium oxide ($RuO_2$) and a sinter binder of glass oxide (the major composition: PbO, $SiO_2$ and $B_2O_3$), a base 2 formed of alumina ceramic, probes 3, a controller 4 and a laser beam 5 such as a pulsed laser beam which is, in the illustrated embodiment, a pulsed YAG laser beam, these members being arranged in a manner similar to that in FIG. 3.

According to the present invention, electric resistance of the resistor material 1 is reduced by irradiating a laser beam 5 on the surface of the resistor material 1 without cutting away any portion thereof. More specifically, by irradiating one pulse of a laser beam 5 in the form of a pulsed YAG laser beam (having a pulse width of 10 ns, average output power of 30 mj/p, and peak output power of 2 MW) on the surface the resistor material 1 having an initial electric resistance of 291 ohms, which is mounted on the alumina ceramic base 2, the electric resistance of the resistor material 1 is reduced to a value of 285 ohms. As a result of further irradiation of five pulses of the laser beam 5, the electric resistance of the resistor material 1 is further reduced to 255 ohms. This is because the chemcial state of the resistor material 1 is caused to change by irradiation of the laser beam 5 so that the specific resistance inherent to a resistor material 1 varies to reduce the value of electric resistance thereof. In this connection, it may be considered that such a change in the chemical state results from a partial reduction of the conductive particles of ruthenium oxide and the sinter binder of glass oxide, as expressed by the following formulae.

$RuO_2 \rightarrow Ru + O_2$ $PbO \rightarrow Pb + \frac{1}{2}O_2$ $SiO_2 \rightarrow Si + O_2$ $B_2O_3 \rightarrow 2B + 3/2O_2$ It has been found that the amount of reduction in electric resistance is dependent upon the irradiation conditions of the laser beam 5 such as, for example, number of pulses, pulse width, output power, intervals between pulses, distance between the surface of the resistor material 1 and the focal point of the laser beam 5, and the like. Therefore, by controlling the resistance of the resistor material 1 through the irradiation conditions of the laser beams 5, it is possible to obtain a resistor with a desired resistance value.

Since the resistor thus obtained has no cutting groove formed therein, there is no generation of micro cracks and hence there will be substantially no or little change in the resistance of the resistor over time. In addition, the resistance value of the resistor material 1 can be set before hand to be smaller than a desired value so that a resistor of a smaller area can be provided, thus enabling miniaturization of a hybrid IC having such resistors as well as high-density arrangement thereof without any difficulty.

Figure 3:
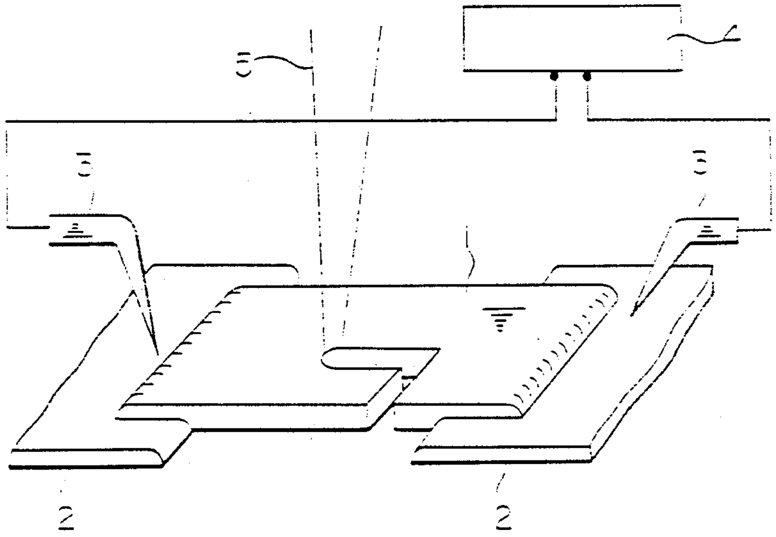
FIG. 3 is a schematic illustration showing a conventional method for controlling electric resistance of a compound-type resistor.

Moreover, it is possible to use the above-described method of the invention in combination with the aforesaid conventional method as illustrated in FIG. 3 for the purpose of realizing a more versatile control method. In this regard, in the aforesaid conventional method as illustrated in FIG. 3, it is impossible to remedy or decrease an excessively increased resistance value of the resistor material where the resistor material has been cut away to an excessive extent. In such cases, however, such resistor material can be remedied for practical use by means of the above method of the present invention.

FIG. 2 illustrates a method for controlling electric resistance of a compound-type resistor in accordance with another embodiment of the present invention. In FIG. 2, reference numerals 1 through 5 represent the same elements as those shown in FIG. 1.

In this embodiment, a laser beam 5 in the form of a pulsed YAG laser beam is first irradiated on a resistor material 1 in the form of a ruthenium-oxide-type thick-film like resistor material so that a portion of the resistor material 1 is cut away to increase electric resistance thereof to nearly a predetermined value, that is to a value slightly greater than the predetermined value. Thereafter, similar to the first-mentioned embodiment, the resistor material 1 thus cut away is irradiated by a laser beam 6 in the form of a pulsed YAG laser beam so as to cause a change in the chemical state thereof whereby the specific resistance inherent to the resistor material 1 is decreased, thereby decreasing the electric resistance of the resistor material 1 to the predetermined value in a precisely controlled manner. In this case, the irradiation conditions of the laser beam 5 such as pulse width, average output power, and peak value of output power are the same as those in the first-mentioned embodiment. In this manner, electric resistance of the resistor material 1 can be precisely set at an intended value without any difficulty, and the cutting speed of the laser beam 5 can be increased so that the time required for controlling electric resistance of the resistor material 1 can be substantially shortened.

On the other hand, although in the second-mentioned embodiment, irradiation of the laser beam 6 causes a change in the chemical state of the resistor material 1 so as to decrease the electric resistance value thereof, contrary to this, it may be considered that by appropriately controlling irradiation conditions to be described later in detail, irradiation of a laser beam 7 can change the chemical state of the resistor material 1 in a sense to increase the electric resistance value thereof. In fact, by irradiating a YAG laser beam having a light intensity of 20 mJ and a spot diameter of 1.5 mm on the resistor material 1 whose resistance had already been reduced to 255 ohms in the above-described manner, the resistance of the material 1 was increased to 261 ohms. In this case, it was felt that the laser beam 7, the same as that in 6 presumably caused an oxidizing reaction as expressed by the following formula:

$Ru + O_2 \rightarrow RuO_2$ $Pb + \frac{1}{2}O_2 \rightarrow PbO$ $Si + O_2 \rightarrow SiO_2$ $2B + 3/2O_2 \rightarrow B_2O_3$ In the case of using the laser beam 7, the resistor material 1 may be first cut away by irradiation of the laser beam 5 so as to roughly increase its electric resistance to a value less than a predetermined value, and then the laser beam 7 is irradiated on the resistor material 1 to thereby further increase the resistance to the predetermined value in a precisely controlled manner. In this case, the above oxidizing reaction will become remarkable if oxygen gas is blown to the spot on the surface of the resistor material 1 irradiated by the laser beam 7.

In this connection, it is to be noted that the chemical reactions caused by the laser beams 6 and 7 are both dependent on the wavelength, the average output power, the peak output value of each laser beam, the distance between the surface of the resistor material and the focal point of each laser beam, and the type and temperature of the atmosphere on the surface of the resistor material. Accordingly, it is possible to control the above chemical reactions firstly by disposing the resistor material 1 in a fluid-tight sealed vessel which has a window for passage of a laser beam and which is filled with a certain kind(s) of gas(es) and in which the type and temperature of the gaseous atmosphere may be varied, or secondly by blowing a neutral gas, a reducing gas or an oxidizing gas onto the surface of the compound-type resistor material 1.

Although in the latter embodiments, after a portion of the resistor material 1 is first cut away by irradiation of the laser beam 5 so as to increase its electric resistance, it is further irradiated by the laser beam 6 or 7 to change its chemical state so that the specific resistance inherent to the resistor material 1 is varied to either increase or decrease the resistance value thereof, such steps can be reversed. That is, the laser beam 6 or 7 can first be irradiated on the resistor material 1 so as to change its chemcial state whereby the specific resistance inherent to the resistor material 1 is varied to increase or decrease its electric resistance to a value less than a predetermined value, and then a portion of the resistor material 1 is cut away by means of the laser beam 5 so as to increase its electric resistance to the predetermined value. In this case, it is easy to control electric resistance of the resistor material 1 because such control is effected in two steps.

In addition, it should be noted that in the second-embodiment, it is possible to use only one or both of the laser beams 6 and 7 without employing the laser beam 5. In these cases, the resistor thus obtained has no cutting groove formed therein so that there is no generation of micro cracks and hence there will be substantially no or little change in the resistance of the resistor over time. Further, the area of the resistor material 1 can be reduced.

Although in the above-described embodiments, the resistor material 1 is of a $RuO_2$ type, it may be of other metallic-oxide-type resistor materials such as a $Cr_2O_3$ type, a $TiO_2$ type, a PbO type, a $SiO_2$ type, a $B_2O_3$ type or the like, and it may further be a metallic-nitride-type resistor material such as an AlN type, a $Si_3N_4$ type or the like, or a metallic-carbide-type resistor material such as a SiC type, a WC type or the like. In these materials, specific resistance (Ω.m) can be reduced by irradiation of a laser beam.

Further, although in the above-described embodiments, a pulsed YAG laser beam in the infrared range is employed for the respective laser beams 5, 6 and 7, a laser beam in the ultraviolet or visible range can be used according to the nature or property of the resistor material. In this case, if irradiation conditions of such a laser beam are chosen or set to suit a resistor material to be treated, irradiation of the laser beam can cause a change in the chemical state of the resistor material 1 thereby to decrease or increase the specific resistance thereof. As a result, the resistance value of the resistor material can be controlled to decrease or increase.

Although in the above embodiments, a laser beam is directly irradiated on a resistor material, the present invention is also applicable to the case where a resistor material is provided on its surface with a film of a different material. In this case, a laser beam can be irradiated on the resistor material through the film so as to change the electric resistance thereof. For example, when a ruthenium oxide type resistor material having a polyimide film of 10 μm in thickness formed on its surface is irradiated by one pulse of a laser beam, the initial electric resistance of the material is reduced to 295 ohms. In this regard, there is no damage to or degradation of the polyimide. Also, it is to be noted that materials for the film on the resistor material is not limited to polyimide but may be other polymer materials or certain kinds of inorganic materials having an appropriate film thickness able to permit at least partial passage of a laser beam.

We claim:

1. A method for controlling electric resistance of a compound-type resistor material comprising:

irradiating a laser beam on a compound-type resistor material so as to cause a change in its chemical state and provide a desired value of electrical resistance anywhere within a range above and below a value of specific resistance inherent to said compound-type resistor material.

2. A method for controlling electric resistance of a compound-type resistor material as set forth in claim 1 wherein by irradiation of said laser beam, said compound-type resistor material is subjected to a reducing reaction so that a specific resistance inherent to said compound-type resistor material is decreased, thereby reducing its electric resistance.

3. A method for controlling electric resistance of a compound-type resistor material as set forth in claim 2 wherein the amount of decrease in the resistance value of said compound-type resistor material is controlled by irradiation conditions of said laser beam including number of pulses, pulse width, output power, intervals between pulses, distance between a surface of the compound-type resistor material and a focal point of said laser beam, and type and temperature of atmosphere surrounding the surface of said compound-type resistor material.

4. A method for controlling electric resistance of a compound-type resistor material as set forth in claim 1 wherein as a result of irradiation of said laser beam, said compound-type resistor material is subjected to an oxidizing reaction so that the specific resistance inherent to said compound-type resistor material is increased, thereby increasing its electric resistance.

5. A method for controlling electric resistance of a compound-type resistor material as set forth in claim 4 wherein the amount of increase in the resistance value of said compound-type resistor material is controlled by irradiation conditions of said laser beam including number of pulses, pulse width, output power, intervals between pulses, distance between a surface of the compound-type resistor material and a focal point of said laser beam, and type and temperature of atmosphere surrounding the surface of said compound-type resistor material.

6. A method for controlling electric resistance of a compound-type resistor material as set forth in claim 1 wherein said compound-type resistor material is selected from the group consisting of a metallic-oxide-type resistor material, a metallic-nitride-type resistor material, and a metallic-carbide-type resistor material.

7. A method for controlling electric resistance of a compound-type resistor material as set forth in claim 1 wherein said compound-type resistor material comprises conductive particles and a binder.

8. A method for controlling electric resistance of a compound-type resistor material as set forth in claim 7 wherein said conductive particles are composed of ruthenium oxide.

9. A method for controlling electric resistance of a compound-type resistor material as set forth in claim 7 wherein said binder is selected from the group consisting of lead oxide, boron oxide, silicon oxide, and a mixture of more than one of them.

10. A method for controlling electric resistance of a compound-type resistor material as set forth in claim 6 wherein said laser beam is selected from the group consisting of an infrared-range beam, a visible-range beam, and an ultraviolet-range beam.

11. A method for controlling electric resistance of a compound-type resistor material as set forth in claim 6 wherein said metallic-oxide-type resistor material is selected from the group consisting of a ruthenium-oxide-type thick-film like resistor material, a chrome-oxide-type thick-film like resistor material, and a titanium-oxide-type thick-film like resistor material.

12. A method for controlling electric resistance of a compound-type resistor material as set forth in claim 6 wherein said metallic-nitride-type resistor material is selected from the group consisting of a aluminum-nitride-type thick-film like resistor material and a silicon-nitride-type thick-film like resistor material.

13. A method for controlling electric resistance of a compound-type resistor material as set forth in claim 6 wherein said metallic-carbide-type resistor material is selected from the group consisting of a silicon-carbide-type thick-film like resistor material and a tungsten-carbide-type resistor material.

14. A method for controlling electric resistance of a compound-type resistor material as set forth in claim 1 wherein said resistor material has a film of a laser-beam transmitting material formed on its surface.

15. A method for controlling electric resistance of a compound-type resistor material as set forth in claim 14 wherein said film is formed of a polymer.

16. A method for controlling electric resistance of a compound-type resistor material as set forth in claim 15 wherein said polymer is polyimide.

17. A method for controlling electric resistance of a compound-type resistor material comprising:

a first step of irradiating a laser beam onto a compound-type resistor material to cut away a portion thereof, thus increasing its electric resistance; and a second step of irradiating a laser beam on said compound-type resistor material so as to cause a change in its chemical state and vary the specific resistance inherent to said compound-type resistor material to thereby change its electric resistance to a desired value.

18. A method for controlling electric resistance of a compound-type resistor material as set forth in claim 17 wherein said first step is carried out before said second step.

19. A method for controlling electric resistance of a compound-type resistor material as set forth in claim 17 wherein said second step is carried out before said first step.

20. A method for controlling electric resistance of a compound-type resistor material as set forth in claim 18 wherein in said first step, the resistance value of said compound-type resistor material is increased beyond a predetermined value, and in said second step, by irradiation of said laser beam, said compound-type resistor material is subjected to a reducing reaction so that the specific resistance inherent to said compound-type resistor material is decreased, thereby reducing its electric resistance to said predetermined value.

21. A method for controlling electric resistance of a compound-type resistor material as set forth in claim 20 wherein the amount of decrease in the resistance value of said compound-type resistor material is controlled by irradiation conditions of said laser beam including number of pulses, pulse width, output power, intervals between pulses, distance between a surface of the compound-type resistor material and a focal point of said laser beam, and type and temperature of atmosphere surrounding the surface of said compound-type resistor material.

22. A method for controlling electric resistance of a compound-type resistor material as set forth in claim 18 wherein in said first step, the resistance value of said compound-type resistor material is increased to a value smaller than a predetermined value, and in said second step, by irradiation of said laser beam, said compound-type resistor material is subjected to an oxidizing reaction so that the specific resistance inherent to said compound-type resistor material is increased, thereby increasing its electric resistance to said predetermined value.

23. A method for controlling electric resistance of a compound-type resistor material as set forth in claim 22 wherein the amount of increase in the resistance value of said compound-type resistor material is controlled by irradiation conditions of said laser beam including number of pulses, pulse width, output power, intervals between pulses, distance between a surface of the compound-type resistor material and a focal point of said laser beam, and type and temperature of atmosphere surrounding the surface of said compound-type resistor material.

24. A method for controlling electric resistance of a compound-type resistor material as set forth in claim 17 wherein said compound-type resistor material is selected from the group consisting of a metallic-oxide-type resistor material, a metallic-nitride-type resistor material, and a metallic-carbide-type resistor material.

25. A method for controlling electric resistance of a compound-type resistor material as set forth in claim 24 wherein said laser beam is selected from the group consisting of an infrared-range beam, a visible-range beam, and an ultraviolet-range beam.

26. A method for controlling electric resistance of a compound-type resistor material as set forth in claim 24 wherein said metallic-oxide-type resistor material is selected from the group consisting of a ruthenium-oxide-type thick-film like resistor material, a chrome-oxide-type thick-film like resistor material, and a titanium-oxide-type thick-film like resistor material.

27. A method for controlling electric resistance of a compound-type resistor material as set forth in claim 24 wherein said metallic-nitride-type resistor material is selected from the group consisting of a aluminum-nitride-type thick-film like resistor material and a silicon-nitride-type thick-film like resistor material.

28. A method for controlling electric resistance of a compound-type resistor material as set forth in claim 24 wherein said metallic-carbide-type resistor material is selected from the group consisting of a silicon-carbide-type thick-film like resistor material and a tungsten-carbide-type resistor material.

29. A method for controlling electric resistance of a compound-type resistor material as set forth in claim 17 wherein said resistor material has a film of a laser-beam transmitting material formed on its surface.

30. A method for controlling electric resistance of a compound-type resistor material as set forth in claim 29 wherein said film is formed of a polymer 31. A method for controlling electric resistance of a compound-type resistor material as set forth in claim 30 wherein said polymer is polyimide.

* * * * *